(No Model.)
S. STEWART.
KEY BOARD.
No. 334,484. Patented Jan. 19, 1886.
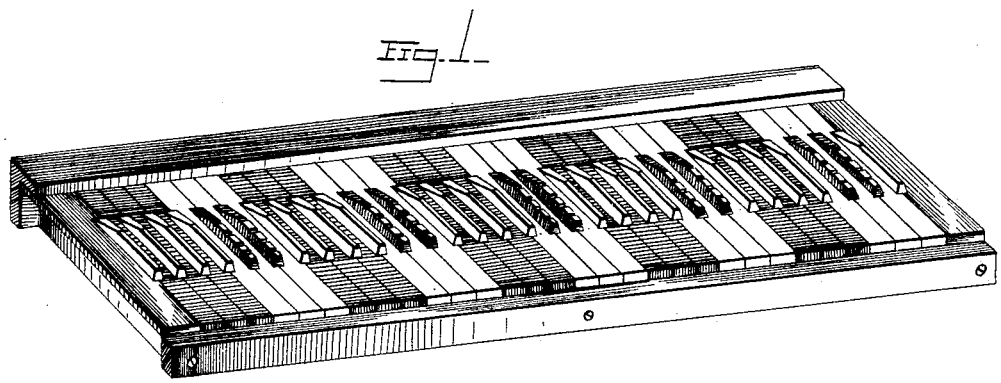
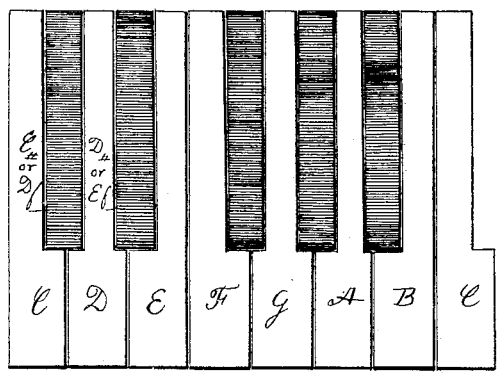
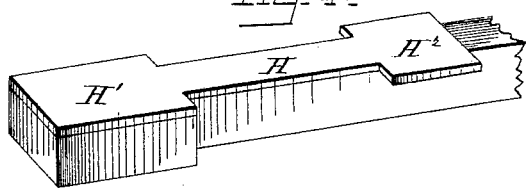
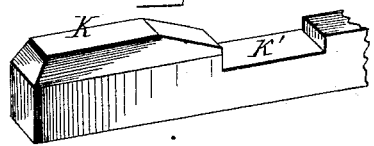
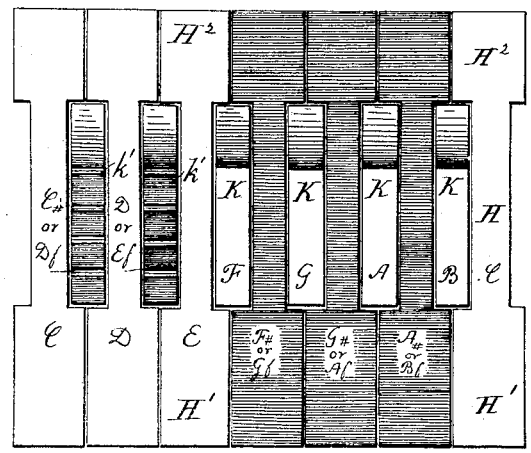
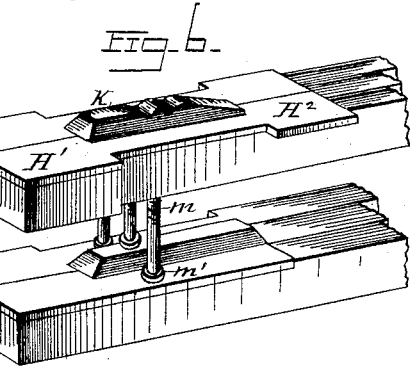
Witnesses:
W. B. Masson
E. C. Wurdeman
Inventor:
Scott Stewart,
by E. E. Masson
atty.

UNITED STATES PATENT OFFICE.

SCOTT STEWART, OF RIVESVILLE, WEST VIRGINIA.

KEY-BOARD.

SPECIFICATION forming part of Letters Patent No. 334,484, dated January 19, 1886.

Application filed June 9, 1885. Serial No. 168,137. (No model.)

*To all whom it may concern:*

Be it known that I, SCOTT STEWART, a citizen of the United States, residing at Rivesville, in the county of Marion and State of West Virginia, have invented certain new and useful Improvements in Key-Boards, of which the following is a specification, reference being had therein to the accompanying drawings.

My invention relates to improvements in key-boards provided with two or more ranges of keys arranged upon different planes, but wherein only one mode of fingering is required for all the twelve different scales, and the labor of learning to play in any scale or key is greatly shortened; and the objects of my improvement are, first, to enable the performer to play back of the raised keys upon the same level as the front portion of the flat keys; second, to construct all the flat keys of uniform size and shape, but to provide means for them to be recognized in the light or in the dark. I accomplish these objects by the construction illustrated in the accompanying drawings, in which—

Figure 1 is a perspective of a key-board constructed in accordance with my invention. Fig. 2 is a top view of a portion of an ordinary key-board. Fig. 3 is a top view of a portion of the improved key-board. Figs. 4 and 5 are perspective views of one of the improved flat keys and raised keys, respectively. Fig. 6 is a perspective view of a portion of the improved key-board resting upon a portion of an ordinary key-board.

Similar letters refer to similar parts throughout the several views.

The flat keys are all of uniform size and configuration, and are one-sixth wider than ordinary keys. They have a narrow portion, H, between the front portion, H', and the back portion, H²; but said middle portion, H, is still wide enough to receive fingers of ordinary size. These parts H H' H² are all in the same horizontal plane, and between the flat keys pyramidal raised keys K are located. There are six raised keys for each octave, and to facilitate their recognition in the light four of them in successive order are white and the two following are black, and to facilitate their recognition in the dark the tops of these black keys are corrugated, as shown at $k$. The flat keys are also preferably made of two colors—three white followed by three black—but generally the distinction and arrangement made in the raised keys will be sufficient for a performer to recognize all the keys. In the surface of each lever carrying the raised keys a notch, K', is made immediately in the rear of said raised key to receive the overlapping sides of the back portion, H², of the flat keys.

To permit the improved key-board to be placed over an ordinary key-board and have the improved keys operate the ordinary keys, each one of these improved keys has a pendent pin or adjustable screw, $m$, the head $m'$ of which rests upon each key of the ordinary key-board, and to prevent their abrasion the head $m'$ of each screw has a covering of rubber or of felt, and the length of each screw is regulated to bear evenly either upon one of the flat or upon one of the raised keys.

By means of this improved key-board performers are enabled to play back of the raised keys and on the same plane with the front or flat keys when by reason of the position of the hand it is inconvenient to play in front of them, or if the fingers are too large to play between them, thus affording a simple means by which the key-board can be easily operated by a large hand, and at the same time not extending the octave beyond the reach of a small or delicate hand. The flat keys are one-sixth wider than those commonly in use, and although the width of the octave is the same as heretofore there is sufficient room for ordinary fingers to play upon the flat keys between the raised keys.

Key-boards have been arranged with two or more ranges of keys arranged in steps one above the other; but they require difficult and inconvenient motions of the hands and of the fingers. By having the raised keys between front and rear ranges of flat keys arranged in the same plane the fingering of the instrument is facilitated. As all the raised keys are at equal distances apart from each other, it might be difficult to strike the right key at once while in the dark; but the arrangement of corrugated keys permits them to be found immediately without any light.

In this key-board there is in each octave one more raised key and one less flat key than there is in an ordinary key-board, and they are so arranged that when placed one above the other each key stands over a key of the same letter, and the pendent pins or screws *m* rest upon the corresponding keys of an ordinary key-board, so that any person is enabled to test the improvement upon any organ or piano at hand without requiring the manufacturing of new organs or pianos, or even removing the key-boards in use.

I am aware that key-boards have been made with a row of raised or pyramidal keys placed at even distances apart, and that key-boards having a different arrangement of keys have been superposed, and that the flat keys of others have been made of different colors in series of three, and I do not claim these arrangements.

Having now fully described my invention, I claim—

1. In a key-board, a row of raised keys all located at equal distances apart from each other, in combination with a range of flat keys exposed in the same plane in front and in the rear of said raised keys, substantially as and for the purpose described.

2. A key-board having each octave consisting of six raised keys, of which one or more have their upper surfaces corrugated, and six flat keys in front of said raised keys, substantially as and for the purpose described.

In testimony whereof I affix my signature in presence of two witnesses.

SCOTT STEWART.

Witnesses:
F. F. PRICKETT,
E. S. CLAYTON.